United States Patent [19]

Lemanski

[11] 4,012,748
[45] Mar. 15, 1977

[54] CAMERA DEVICE FOR OBTAINING A SPLIT IMAGE

[76] Inventor: Savarian F. Lemanski, 109 Taylor Ave., Detroit, Mich. 48202

[22] Filed: May 15, 1975

[21] Appl. No.: 577,683

[52] U.S. Cl. .............................. 354/122; 354/289
[51] Int. Cl.² .......................................... G03B 1/00
[58] Field of Search .......... 354/120, 122, 289, 121, 354/296, 123–126, 354; 116/114 J

[56] References Cited

UNITED STATES PATENTS

| 492,025 | 2/1893 | Klay | 354/124 |
|---|---|---|---|
| 1,533,433 | 4/1925 | Linden | 354/122 |
| 2,279,715 | 4/1942 | Nagel | 116/114 J |
| 3,122,077 | 2/1964 | Splendore | 354/122 X |
| 3,318,218 | 5/1967 | Yax | 354/122 |

Primary Examiner—John Gonzales
Attorney, Agent, or Firm—Whittemore, Hulbert & Belknap

[57] ABSTRACT

A device or attachment is disclosed which is adapted to be mounted upon a modern day camera, ordinarily a hand-held type, which enables the production on a single print of a number of different images of many different types, multichromatic or monochromatic, these images, two or four in number, being exposed successively on different, usually equal areas of a film frame. The device comprises an adapter ring in the form of a well-finished, split circular aluminum casting which is semi-permanently but removably mounted to the cylindrical lens mounting housing of the camera. This adapter has concentrically and rotatably mounted thereon a support plate for an opaque mask-carrying slide unit, the latter being equipped with a spring urged ball detent means enabling a special mask of the unit to be selectively indexed rotatably by the user into different positional settings, for example, two or four.

6 Claims, 14 Drawing Figures

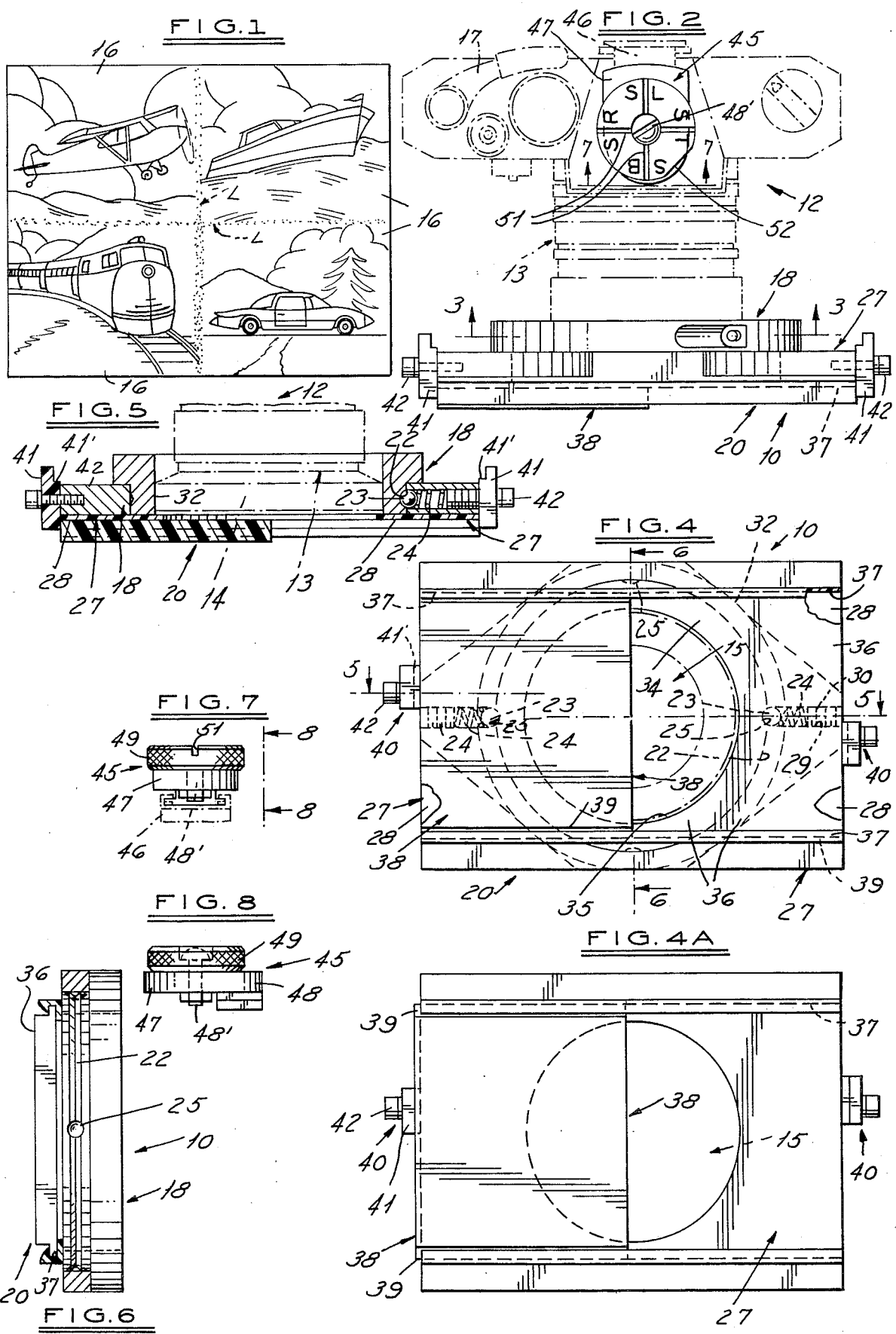

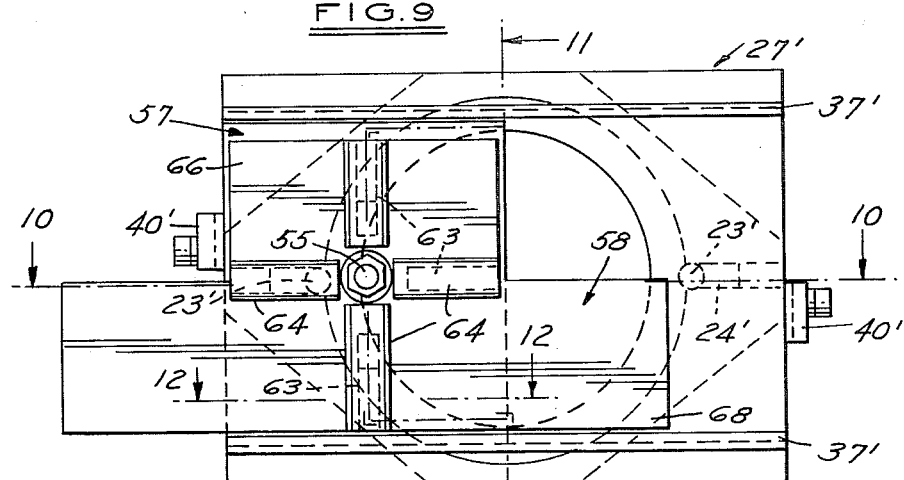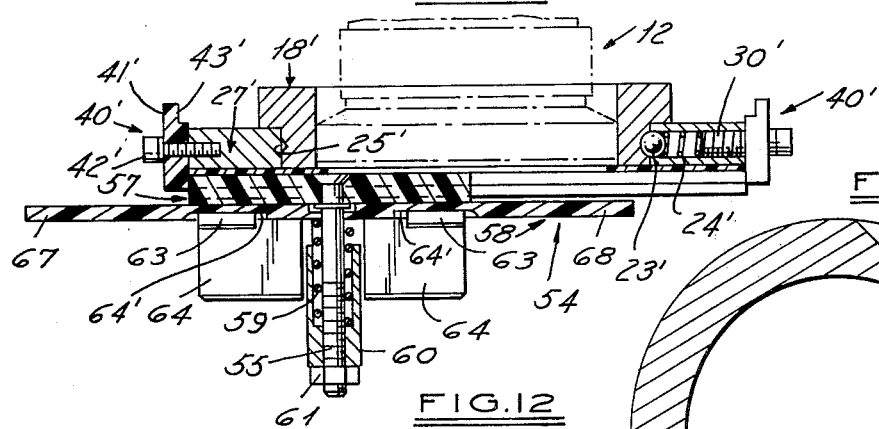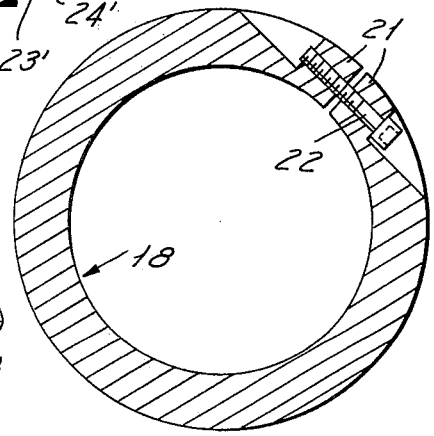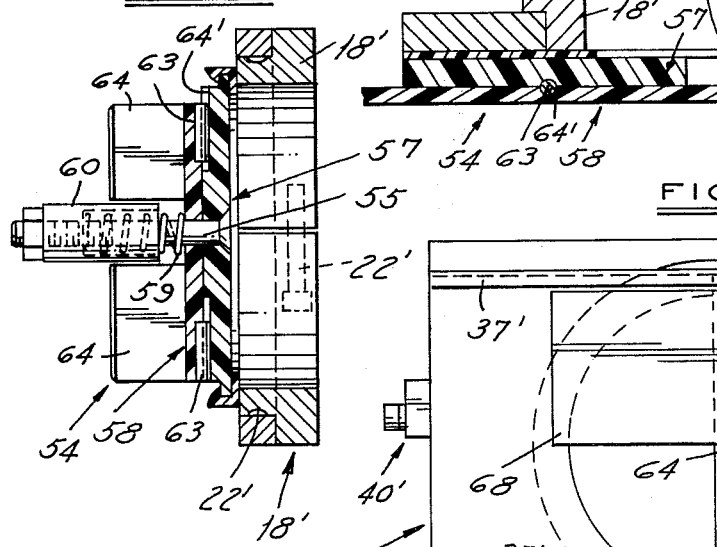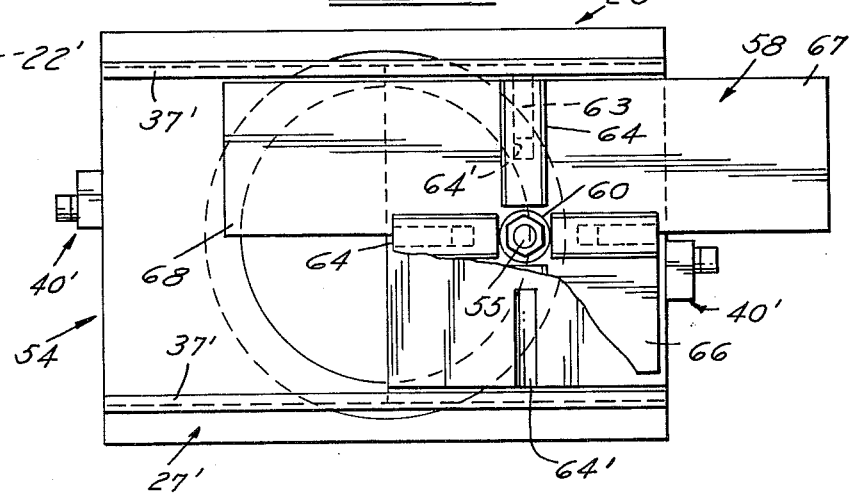

CAMERA DEVICE FOR OBTAINING A SPLIT IMAGE

BACKGROUND OF THE INVENTION

Field of the Invention and Prior Art

As appears from the above, the invention has a highly specialized field of use, namely in the artistic non-commercial or commercial production of split image photographs. It is also well adapted for use in a slide projector type of setting in which sub-divided or split image transparency slides are to be projected onto a screen, etc.

To my knowledge and in my experience, there is no prior art of any consequence, the improvement of the invention being unique.

SUMMARY OF THE INVENTION

The invention is structurally summarized adequately in the Background set forth above. Otherwise, it makes possible the easy, quick and low cost production of multiple or split photographic images on a single print, which images may be of a wide variety as to subject matter. Typically illustrated herein is a print or film containing four equal area images of different types of transportation means as monochromatically depicted herein but actually and usually in color, selected because they are readily recognizable in character by their shape and accepted different colorations. In other adaptations of the invention, juxtaposed pictures of different areas of a single or plural locations may be shown; a single print showing a number of generally similar but individually much different reproductions of animate and/or non-animate material may be produced; objects may be shown superimposed or juxtaposed relative to different background settings; and so on in a wide, almost limitless number of adaptations.

Importantly, in each and any of these variations the images, although readily recognizable as individually distinct in character, are substantially free of readily noticeable lines of area demarcation, horizontal and/or vertical. The device adds little or nothing to the bulk or weight of the camera itself, and is readily transportable by hand without any particular type of carrying equipment. As should appear from the above, the invention has artistic appeal in many different fields and ways.

BRIEF DESCRIPTION OF THE DRAWINGS

FIG. 1 is a small scale view of a typical multi-color split image reproduction capable of being had by the improvement of the invention, showing a picture, transparent or otherwise, of four distinctly different types of vehicle as being typical of the wide variety of objects depicted, the view likewise typically only faintly indicating 90° lines of demarcation between the individual images, which lines are scarcely if at all perceptible in an actual print;

FIG. 2 is a solid-line top plan view of the device or attachment as mounted to a conventional automatically indexing camera, shown in dot-dash line, with a manually settable indicator knob or button also appearing in solid line as an optional convenient adjunct of the attachment;

FIG. 3 is a view in vertical cross section along line 3—3 of FIG. 2 illustrating a method of semi-permanently attaching the split-ring adapter mount of the improvement on the camera;

FIGS. 4 and 4A are similar front-elevational views of the device of the invention in a first rectangular mask adaptation thereof, FIG. 4A in particular showing an over-center offset adjustment of the opaque mask part of the device in relation to the lens opening area of the camera, appearing in dotted lines;

FIG. 5 is a view in horizontal section on broken line 5—5 of FIG. 4, showing a ball and spring detent and groove provision of the device for maintaining its mask element in any 90° indexed position, the view also showing adjustable end stops for the mask by which the settings of FIGS. 4 and 4A are accurately attained;

FIG. 6 also shows a detail of the spring ball and groove detent means on the adapter ring of the device, which ring means enables a ready complete separation of the device from the camera when its use is not desired, as well as a remounting thereof;

FIG. 7 is an elevational view in the direction from the arrows 7—7 of FIG. 2, showing a simple manually settable indicator which may be utilized for convenience and assurance in using the improvement of the invention.

FIG. 8 is an elevational view of said indicator from the direction of 8—8 in FIG. 7;

FIG. 9 is a front elevational view, generally similar to FIGS. 4 and 4A, of a different but essentially similar embodiment of the invention enabling the splitting of images produced into four quadrantal shaped segments, whereas FIGS. 4 and 4A contemplate a two segment, 180° split of images;

FIG. 9A is an elevational view similar to FIG. 9 with the special T-shaped mask plate of that version of the improvement appearing in a 180° indexed setting as compared with FIG. 9;

FIG. 10 is a view in horizontal section on line 10—10 of FIG. 9, showing detent means similar to that of the first embodiment, also a different optional method of spring-biasing the mask plate against movement by accident from a desired pre-setting;

FIG. 11 is a view in vertical section on line 11—11 of FIG. 9, showing a roller and groove type of hold for the mask element on its adapter ring-mounted plate; and FIG. 12 is another horizontal sectional view, fragmentary in nature, on line 12—12 of FIG. 9 further showing the holding feature just referred to above.

DESCRIPTION OF PREFERRED EMBODIMENTS

FIGS. 2–8, inclusive, show a first embodiment of the device of the invention, generally designated by the reference numeral 10, as being operatively and illustratively applied to a well-known type of 35mm camera 12 characterized by a forwardly projecting, generally cylindrical lens housing 13. This can be of any of many different manufactures, expensive and inexpensive, characterized by such a housing. The illustrated embodiment happens to be a Japanese-produced Konica Autoreflex $T_3$ which features, as appears best in FIG. 5, a forward flanged lens housing formation 14 in which the actual optical lens 15 (appearing in FIGS. 4 and 4A) is forwardly exposed.

By preference, and for the best artistic result in utilizing the device 10, the camera 12 is multichromatically responsive in a high quality degree of faithfulness and adapted to reproduce multi-color images 16 (FIG. 1) on a single film frame for subsequent enlargement if this is desired. Otherwise, as indicated above, the frame may simply mount the usual transparency for visual viewing or projection on a screen. In any case, the frame is held against indexing shift after any split image exposure when the camera's shutter is cocked by manipulation of its conventional external arm 17 (FIG. 2) characterizing the illustrated camera model 12.

Actually, the adaptation 10 as herein described is one designed for the production of but two equally split images; although FIG. 1 depicts the images as being four in number, actually produced by the alternative version of the invention illustrated in FIGS. 9 through 12, or a variation thereof. Typically the images may be reproductions of, for example, an airplane, a boat, a railway unit and an automobile, chosen because of their distinct colorations and/or shapes but as previously mentioned, the areas of utilization of the improvement 10 are manifold.

As shown in FIGS. 2 through 6, the device 10 essentially comprises a mounting adapter ring 18 and an adjustable mask unit 20 removably and adjustably carried thereby. Ring 18, as appears in FIG. 3, is a split type having opposed bosses 21 adjacent the split thereof; and one of these bosses threadedly receives an Allen-type take-up screw 22 spanning the split of the ring. The ring's internal diameter is substantially the same as the outer diameter of the lens housing flange 14, so that as applied peripherally to said flange the screw 22 may be taken up tightly to semi-permanently mount the split image unit 10 on the camera 12. Its removal is not contemplated but is, of course, readily and speedily accomplished if wished.

As appears in FIGS. 4, 5 and 6, the mounting ring 18 is formed with an internal continuous circular groove 22 extending completely thereabout, and the mask sub-assembly or unit 20 carries, as best shown in FIG. 4, a pair of 180° opposed detent balls 23, each biased inwardly by a small coil compression spring 24, for releasable engagement in the detent groove 22. The latter is interrupted at 90° intervals by semi-spherical ball seat indentations 25; and with these seats engaged by the detent balls 23, the holder 20 being accurately indexable in 90° increments, is steadily held in any adjusted position by the ball and detent arrangement. Yet a simple forward or outward pull of the mask sub-assembly 20 enables the latter to be entirely removed from camera 12, the springs 24 yielding radially to permit this.

The mask unit 20, as best shown in FIGS. 2 and 5, comprises a mounting plate 27 which is (FIG. 4) in the main of a generally diamond-shaped outline, but truncated at its four corners; and the plate 27 has integral reduced thickness triangular flange extensions 28 at the rear side of each of these four corner areas. At its wider spread corner apices, the relatively thick body portion of mounting plate 27 is diametrically oppositely drilled at 29 to afford bores in which the ball and spring detent units 23, 24 are disposed, the springs 24 being retained in place under compression by small set screws 30 threaded into the bores 29.

Mounting plate 27 has a relatively large central circular through-opening 32, into which the detent balls 23 project slightly in the radial direction for seating engagement with the adapter ring's detent groove 22 and seat indentations 25, as appears in FIGS. 4 and 5; and, as indicated above, successive indexings of the mask sub-assembly 20 are releasably held in place against disturbance by the spring-urged ball engagements. Plate opening 32 has a diameter corresponding to that of the camera's lens housing flange 14, so as to fit over the latter, being retained by the ball detent sets.

The rear, corner-flanged triangular portions 28 of plate member 27 are relatively thinner than the main central body portion proper of plate 27; and the latter is centrally formed with a circular exposure opening 35 of approximately the same diameter as the lens opening of the camera behind which its lens 15 is located. The opening 35 is coaxially centered on the adapter ring's opening 32; and the slide plate 27 is formed across its front side with undercut or reentrant upper and lower radially undercut horizontal slide groove formations 37. These slidably receive the opaque mask element 38 proper of the unit 20; the clearance is relatively close in order that the mask part 38 may be in a set position.

Said mask is, in the embodiment of FIGS. 4 and 4A, rectangular in outline, being shaped at its top and bottom to provide integral reduced thickness flanges 39 which mate in the slide grooves 37 of mask mount plate 27 as the actual mask part 38 is thus guided in being shifted linearly across the lens opening areas of the camera and the masking unit 20.

As appears best in FIG. 4, the horizontal width of the mask member 38 substantially equals the distance between the horizontal center of the lens 15 and the vertical outer edge of the mount member 27, so that as thus located, the right hand edge (FIG. 4) of the opaque mask element coincides with a vertical diameter of the mask unit 20 as a whole, and truly subdivides the lens area of the attached combination into equal diameter semi-circles. However, in order to enable an adjustment in this respect, the mask proper 38 may be shifted somewhat to right or left, the latter as appears in FIG. 4A, thus disposing the inner masking edge of the member 38 in a slightly offset horizontal relation to the lens center. This adjustment is made possible by resort to a pair of adjustable mask end stops 40 of the masking unit 20.

Considering FIGS. 4 and 4A in conjunction with FIGS. 2 and 5, each of the stops 40 comprises a small block member 41 of a rigid nylon or like plastic material, which is drilled horizontally to receive a manually operable adjusting screw 42. These screws are threadedly engaged into openings tapped in the respective opposite ends of the mounting plate 27 of the mask unit 20, at the main, relatively thick body portion of said part 27. Thus, upon appropriate manipulation of the screws 42, one of the stops 41 is shifted endwise, i.e., to the left as viewed in FIG. 4A, the opposite screw being reversely manipulated rotation-wise for a compensating take-up; and this permits the somewhat over-center positioning of the rectangular mask piece 38. The end result is a diminution, if not total obscuring, of lines of demarcation 43 between images 16 of the reproduction, as suggested in FIG. 1. Each stop block 41 is undercut somewhat at its outer edge 41' to accommodate the thickness of mask element 38 in its over-center position.

In order to prevent accidental sliding displacement of mask part 38, it may be held in place by suitable leaf-type friction springs (not shown) bearing against the face of the mounting plate 27.

The figures show a rectilinearly sliding action of the mask part; however, a rotative slide motion about the center of a notched circular mask is also contemplated, for example, using an opaque disc having a small quadrant-shaped exposure recess.

Finally, as a convenient and simple accommodation for the camera user, the invention contemplates the provision of a simple indicator, generally designated by the reference numeral 45, which is removably attached on the standard flash-holding flange member 46 of the camera 12. In its illustrated form best appearing in FIGS. 2, 7 and 8, the device 45 comprises a rigid nylon seat block 47 equipped with a flanged base 48 which slidably fits frictionally into an undercut groove of flash flange part 46 and is thus frictionally held in place. Seat member 47 is vertically apertured to receive a flat head machine screw 48′, which extends axially through an externally knurled indicator knob piece 49. This is held in any desired rotational position by a small nut applied to the screw from beneath the nylon seat member 47.

As best illustrated in FIG. 2, the manual adjusting knob 49, as frictionally held in place by the screw 48′, presents 90° intersecting horizontal slots or kerfs at 51. These may be appropriately designated, per FIG. 2, by the four notations SR, SL, ST and SB, to indicate visually the existing vertical or horizontal settings at which the masking device 20 is set for two exposures to "shoot" right or left, or top or bottom in any individual lens tripping of the camera. In the case of a 4-exposure splitting of image, a corresponding indicator knob will be differently marked.

It is to be clearly understood that in and after each of these shots the camera's film is held against an automatic indexing frame shift between exposures; and this, in the case of the camera 12 shown in FIG. 2, takes place when the camera's shutter is cocked by a hand manipulation of the external lever 17 of the camera. Thus, a "shoot left" setting SL of the indicator 49 would signal that the left hand half side of the lens, as viewed from the photographer's eye, is open for a one half exposure of the film along a diametral dividing line, either exactly centered on the lens axis, per FIG. 4, or somewhat shifted off-center, per FIG. 4A. After a 90° indexing of the rectangular mask plate 38, the mask device 20 will be set for a corresponding exposure of the film frame through the other vertical half of the lens opening. Of course, similar horizontal split openings are obtained in the same fashion.

A rectilinear, non-90° flat 52 on the indicator knob visually signals that when the flat is not horizontal or vertical the device 10 is out-of-setting for split image work.

The other illustrated embodiment of the invention (FIGS. 9–12) is generally designated by the reference numeral 54, and is one by which the four-panel successive split exposures depicted in FIG. 1 are obtained. In some respects, this particular set of views depicts a less structurally refined one than that of FIGS. 2–5, particularly in respect to the means for preventing undesired lateral shift of the masking part as obtained by the simple frictional arrangement of the earlier-described form. Yet the principle of operation and the result are the same.

That is, as best illustrated in FIG. 10, the frictional anti-displacement means is shown as comprising an elongated flat-head threaded stem or stud 55 which extends through a central portion of the masking unit 54. The head of stem 55 bears downwardly against a block-like slidable mounting part 57 of unit 56, the stem passing through said part and also through the opaque mask part 58 proper of said unit. A coil compression spring 59 surrounds the stem 55, seating into and reacting in the bottom of the bore of a tubular retainer 60. Stem 55 extends through an opening in said bottom, and a nut 61 threaded upwardly thereon permits a desired adjustment of the frictional anti-shift restraining effort exerted upon the inter-associated masking parts 57, 58.

Likewise, FIGS. 9, 11 and 12 illustrate the masking member 57 as being releasably held in place, as end stop-adjusted relative to the camera lens, by either one to two pairs of small cylindrical, needle bearing-type rollers 63 located in diametrically opposed relation to one another. These rollers are shown as carried in tubular housing parts 64 fixed on mask member 58 and are releasably received in correspondingly dimensioned semi-cylindrical grooves 64 on mask part 57, being removably held therein by the force of the spring 59.

Otherwise, although the illustration of the embodiment 54 is a relatively crude one, the arrangements for a slidable indexing mount of the mask member 57 proper upon the camera are as above described and illustrated in regard to the first embodiment. That is, upper and lower flanges of the mounting mask plate 57 are slidably received in undercut flange ways or recesses of a reduced thickness member removably applied to the lens housing of the camera, also an adapter mounting ring is removably applied on the latter. Hence in this respect, parts corresponding to those above illustrated and described in the earlier figures are designated by corresponding reference numerals, primed, and further description is dispensed with.

As a significant and important feature of distinction between the two variants, the main, relatively thin masking part 58 is illustrated (best in FIGS. 9 and 9A) as being generally of a T-shaped outline, that is, there is a main, relatively wide square body portion at 66 which has a pair of opposite, equal length rectangular side arm extensions 67 and 68. A rotative slide motion about the center of a quadrant-notched circular mask is also contemplated as in the case of the embodiment of FIGS. 4–6.

FIG. 9 shows the mask 58 in one adjusted position, in which its body 66 and extension part 67 will effectively mask approximately three of four quarter segments, sectors or quadrants of the lens opening; while FIG. 9A depicts the masking part 58 in a position 180° indexed from that of FIG. 9, in which body 66 and arm extension 68 mask all except a further three-quarters area of the lens. It is of course contemplated that intermediate 90° settings of the mask member 58 may be put into effect, if desired.

It is difficult indeed to depict the manifold multicolor effects which may be had by the use of the invention; and in any of them there are substantially no perceptible lines of demarcation or interdivision of the images, such demarcation lines between image splits 16 being greatly diffused, as simply suggested at L in FIG. 1 of the drawings.

Actually, they are in effect substantially nonexistent in an actual print, particularly when an offset of mask areas is in effect as is suggested in FIGS. 4A, 9 and 9A. The effect is to merge these images into a single integrated representation; yet the diffusion results may be minimized or negated to a great extent or totally under a more precise 90° or 180° relationship of mark areas to the lens area. But when desired, the demarcation may be sharp or much more distinct.

In any event, the modes of use of the device are practically unlimited in number, restricted in effect only by the ingenuity or imagination of the photographer. For example, a view at a long distance may be associated on a single print or film alongside a larger scaled view, in any desired relationship as to location.

The respective nature and settings of the objects depicted may be selected with a view to harmony, contrast and the like, and many other variables of choice are contemplated.

What is claimed is:

1. A split image device comprising an adaptor member to be fixedly applied forwardly of the lens housing of a camera in a position to intercept transmission of a photographic image, a mask mount on said adaptor member, said mask mount having means to adjustably receive a lens mask member, a lens mask member slidably mounted on the mask mount, said lens mask member being shaped so that it obscures a predetermined, substantial area portion of the lens area therebehind to thus prevent a substantial exposure through the lens area portion thus obscured, said lens mask member being slidable diametrically across the camera lens into and out of different masking positions, said mask mount being rotatably mounted on said adaptor member, and yieldable detent means between said mask mount and said adaptor member to releasably hold the mask mount in different rotatively indexed adjustment settings thereof relative to the lens.

2. The device of claim 1, in which said yieldable detent means comprises at least one spring-urged detent ball on said mask mount, the adapter member being fixedly applicable directly on the camera lens housing and having a circular groove releasably engaged radially by said detent ball in a rotatively indexed setting of said mask member, said adapter member groove having at least one radial seat indentation receiving the detent ball in said setting.

3. The device of claim 2, in which said detent ball yields radially from said groove under force applied on the mask mount to permit a full bodily separation of the latter from said adapter member.

4. The device of claim 2, and further comprising means affording an optional bodily shift movement of said lens mask member on the mask mount in relation to the center of the camera lens, said last named means comprising adjustable end stop means on the mask mount engaged by said mask member in a slidably adjusted setting of the latter on said mount.

5. In combination with the split image device of claim 1, an indicator for conjoint use therewith, comprising an indicator member having means to rotatively adjustably mount the same on the camera adjacent said lens housing of the latter, said indicator member being marked to visibly indicate to the user different adjusted rotative settings of the mask member in relation to the camera lens and including means to positively indicate the mask setting as being positioned to photograph to the right, left, top or bottom and including additional means to indicate that no exposures have been made on a film frame.

6. A split image device comprising an adaptor member to be fixedly applied forwardly of the lens housing of a camera in a position to intercept transmission of a photographic image, a mask mount on said adaptor member, said mask mount having means to adjustably receive a lens mask member, a lens mask member slidably mounted on the mask mount, said lens mask member being shaped to that it obscures a predetermined, substantial area portion of the lens area therebehind to thus prevent a substantial exposure through the lens area portion thus obscured, said lens mask member being slidable diametrically across the camera lens into and out of different masking positions, said mask mount being rotatably mounted on said adaptor member, and yieldable detent means between said mask mount and said adaptor member to releasably hold the mask mount in different rotatively indexed adjustment settings thereof relative to the lens, said yieldable detent means comprising at least one spring-urged detent ball on said mask mount, the adaptor member being fixedly applicable directly on the camera lens housing and having a circular groove releasably engaged radially by said detent ball in a rotatively indexed setting of said mask member, said adaptor member groove having at least one radial seat indentation receiving the detent ball in said setting, and means affording an optional bodily shift movement of said lens mask member on the mask mount in relation to the center of the camera lens, said last named means comprising adjustable end stop means on the mask mount engaged by said mask member in a slidably adjusted setting of the latter on said mount.

* * * * *